(12) United States Patent
Applegarth et al.

(10) Patent No.: US 9,211,493 B2
(45) Date of Patent: Dec. 15, 2015

(54) METHOD AND SYSTEM FOR ANHYDROUS AMMONIA RECOVERY

(71) Applicant: SAES Pure Gas, Inc., San Luis Obispo, CA (US)

(72) Inventors: Charles Applegarth, San Luis Obispo, CA (US); Lawrence A. Rabellino, Atascadero, CA (US); Sarah Vogt, Grover Beach, CA (US); Marco Succi, Milan (IT); Cristian Landoni, Novara (IT)

(73) Assignee: SAES Pure Gas, Inc., San Luis Obispo, CA (US)

( * ) Notice: Subject to any disclaimer, the term of this patent is extended or adjusted under 35 U.S.C. 154(b) by 0 days.

(21) Appl. No.: 14/085,744

(22) Filed: Nov. 20, 2013

(65) Prior Publication Data
US 2014/0161699 A1 Jun. 12, 2014

Related U.S. Application Data

(60) Provisional application No. 61/728,542, filed on Nov. 20, 2012.

(51) Int. Cl.
*B01D 53/04* (2006.01)
*C01C 1/12* (2006.01)
(Continued)

(52) U.S. Cl.
CPC ............ *B01D 53/0454* (2013.01); *B01D 53/04* (2013.01); *B01D 53/0476* (2013.01); *B01J 20/08* (2013.01); *B01J 20/103* (2013.01);
(Continued)

(58) Field of Classification Search
CPC .. B01D 53/04; B01D 53/054; B01D 53/0476; B01D 2253/104; B01D 2253/106; B01D 2253/108; B01D 2253/1122; B01D 2257/406; B01D 2258/0216; B01D 2259/4006; C01C 1/12
USPC ............ 96/112, 113, 115, 143; 95/14, 19, 95, 95/128, 148; 423/237
See application file for complete search history.

(56) References Cited

U.S. PATENT DOCUMENTS 4,360,505 A * 11/1982 Sheridan et al. ............ 423/658.2
4,857,083 A * 8/1989 DiMartino ........................ 95/26
(Continued)

FOREIGN PATENT DOCUMENTS

JP 2007-307558 A * 11/2007
WO WO 00/40324 7/2000

OTHER PUBLICATIONS

Machine generated English translation of JP 2007-307558 A, published Nov. 2007.*
(Continued)

*Primary Examiner* — Frank Lawrence
(74) *Attorney, Agent, or Firm* — TIPS Group

(57) ABSTRACT

An apparatus for recycling exhaust gas includes a vessel containing a reversible ammonia sorber material which is exothermic when sorbing ("loading") ammonia and which is endothermic when releasing ("unloading") ammonia. A first valve selectively couples a source of exhaust gas including ammonia to a first port of the vessel, a second valve selectively couples a vacuum pump to the vessel, and a third valve selectively coupling a second port of the vessel to an output. A controller opens and closes the first valve, the second valve and the third valve to implement a loading phase, an intermediate venting phase and an unloading phase for the vessel.

13 Claims, 4 Drawing Sheets

(51) Int. Cl.
  *B01D 53/047* (2006.01)
  *B01J 20/18* (2006.01)
  *B01J 20/08* (2006.01)
  *B01J 20/34* (2006.01)
  *B01J 20/10* (2006.01)
  *B01J 20/28* (2006.01)

(52) U.S. Cl.
  CPC ........... *B01J 20/18* (2013.01); *B01J 20/28052* (2013.01); *B01J 20/3408* (2013.01); *B01J 20/3491* (2013.01); *C01C 1/12* (2013.01); *B01D 2253/104* (2013.01); *B01D 2253/106* (2013.01); *B01D 2253/108* (2013.01); *B01D 2253/1122* (2013.01); *B01D 2257/406* (2013.01); *B01D 2258/0216* (2013.01); *B01D 2259/4006* (2013.01); *B01J 2220/42* (2013.01)

(56) References Cited

U.S. PATENT DOCUMENTS

| | | | |
|---|---|---|---|
| 6,066,192 A * | 5/2000 | Toshinaga et al. | 95/93 |
| 6,261,345 B1 | 7/2001 | Miyano et al. | |
| 6,821,316 B2 | 11/2004 | Guillard et al. | |
| 7,833,311 B2 * | 11/2010 | Givens | 95/14 |
| 2012/0045379 A1 * | 2/2012 | Johannessen et al. | 423/235 |

OTHER PUBLICATIONS

Yang, Ralph T., "Gas Separation by Adsorption Processes, Pressure-Swing Adsorption: Principles and Processes", Jan. 1, 1987, Imperial College Press, pp. 237-247 and 253.

* cited by examiner

METHOD AND SYSTEM FOR ANHYDROUS AMMONIA RECOVERY

CROSS-REFERENCE TO RELATED APPLICATION(S)

This application claims the benefit of U.S. Ser. No. 61/728,542, filed Nov. 20, 2012, and is related to International Patent Application PCT/US13/71086, filed Nov. 20, 2013, both of which are incorporated herein by reference.

BACKGROUND

Ammonia (also known as "azane") is a compound of nitrogen and hydrogen with the chemical formula $NH_3$. Ammonia, as it used commercially, is often called anhydrous ammonia to emphasize the absence of water in the material. Because $NH_3$ boils at −33.34° C. (−28.012° F.) at a pressure of 1 atmosphere, ammonia in liquid form must be stored under high pressure or at low temperatures. Although in wide use, ammonia is both caustic and hazardous.

One of the commercial uses for ammonia is as a process gas for semiconductor manufacturing. For example, ammonia is used for epitaxial deposition of semiconductor materials in a process called metal-organic chemical vapor deposition (MOCVD). MOCVD has become a major process in the manufacture of optoelectronics, such as light emitting diodes (LEDS).

Of the many gasses used in the manufacture of LEDS in MOCVD machines, ammonia is one of the most costly. This is due, in part, to the high purity required of ammonia process gas. For example, if moisture ($H_2O$) or oxygen ($O_2$) molecules are present in the ammonia gas, even in trace concentrations above a few parts per billion (ppb), then oxygen atoms can become incorporated into the crystalline structure of an LED device. Since ammonia is required at high flow-rates during the nitride-crystal growth process, even trace quantities of impurities in the gas can lead to a significant number of unwanted atoms being incorporated into the device. To combat this problem, state-of-the-art LEDS are made using ammonia that typically undergoes purification and contains no more than 1 ppb of moisture or oxygen.

Ammonia gas can be used in very high quantities by MOCVD machines. For example, a single MOCVD process chamber can consume about 10 tons of ultra-high purity ammonia gas per year, and a semiconductor production fab may have 50 MOVCD chambers or more. As such, the cost of ammonia and its disposal after it has been used are problematical.

FIG. 1 illustrates a prior art manufacturing system S including semiconductor manufacturing equipment M, a scrubber Sc and a general exhaust system E. The semiconductor manufacturing equipment M can be, for example, an MOCVD process chamber into which process gasses are injected in order to form epitaxial layers of semiconductor materials. The manufacturing equipment M has exhaust gasses, e.g. $NH_3$, $H_2$, $N_2$ and other compounds at trace levels which are preferably flowed through the scrubber Sc to remove the $NH_3$ before disposing of the remaining gasses in the general exhaust system E.

Verantis Environmental Solutions Group of Cleveland, Ohio sells a "Type MS Mini-Scrubber" which can be used to reduce ammonia content in the exhaust of semiconductor manufacturing equipment. The Mini-Scrubber uses a dilute sulfuric acid solution which is said to achieve a greater than 95% ammonia removal rate. However, it will be appreciated that scrubbers, such as the Verantis Mini-Scrubber, introduce their own complexities due to the use of consumables such as the sulfuric acid solution and the production of waste products that create a disposal problem.

These and other limitations of the prior art will become apparent to those of skill in the art upon a reading of the following descriptions and a study of the several figures of the drawing.

SUMMARY

In an embodiment, set forth by way of example and not limitation, a method for recycling exhaust gas containing ammonia includes: loading a vessel, during a loading phase, with an input gas containing ammonia via a vessel inlet proximate to a first portion of the vessel, wherein the vessel contains a reversible ammonia adsorber material; venting the vessel via a venting outlet, under a vacuum condition, during an intermediate venting phase after the loading phase, wherein the intermediate venting phase has a duration defined by at least one of a time threshold, a vapor pressure threshold and an $N_2$ content threshold; and unloading the vessel via an unloading outlet, under a vacuum condition, during an unloading phase after the intermediate venting phase.

In an embodiment, set forth by way of example and not limitation, an apparatus for recycling exhaust gas includes a vessel containing a reversible ammonia sorber material which is exothermic when sorbing ("loading") ammonia and which is endothermic when releasing ("unloading") ammonia. A first valve selectively couples a source of exhaust gas including ammonia to a first port of the vessel, a second valve selectively couples a vacuum pump to the vessel, and a third valve selectively coupling a second port of the vessel to an output. A controller opens and closes the first valve, the second valve, and the third valve to implement a loading phase, an intermediate venting phase and an unloading phase for the vessel.

An advantage of certain embodiments is that expensive anhydrous ammonia can be recovered and reused for a variety of industrial applications in addition to the non-limiting example of a MOCVD process. Furthermore, the difficulty and expense of scrubbing $NH_3$ from exhaust gas and of disposing of the resulting byproducts has been greatly reduced or eliminated. By way of further non-limiting examples, the exhaust gas from an ammonia recycling system can have less than about 20,000 parts-per-million (ppm) of ammonia and the recycled ammonia can have less than 10,000 ppm of nitrogen (1%).

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
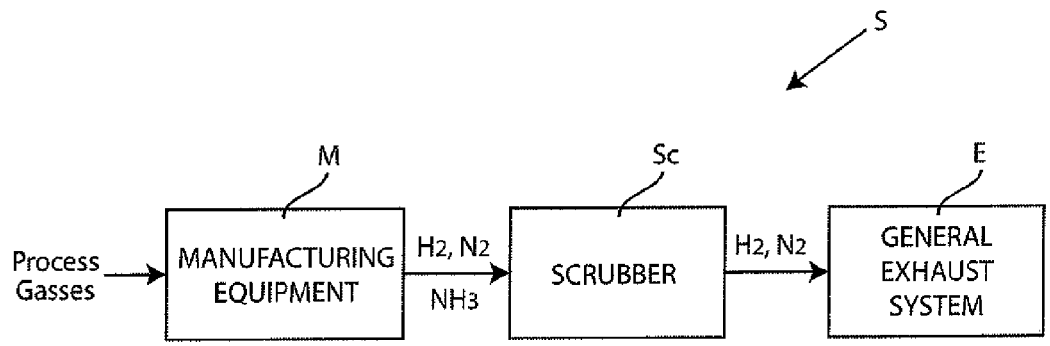
FIG. 1 is a block diagram illustrating a conventional semiconductor manufacturing system.
Figure 2:
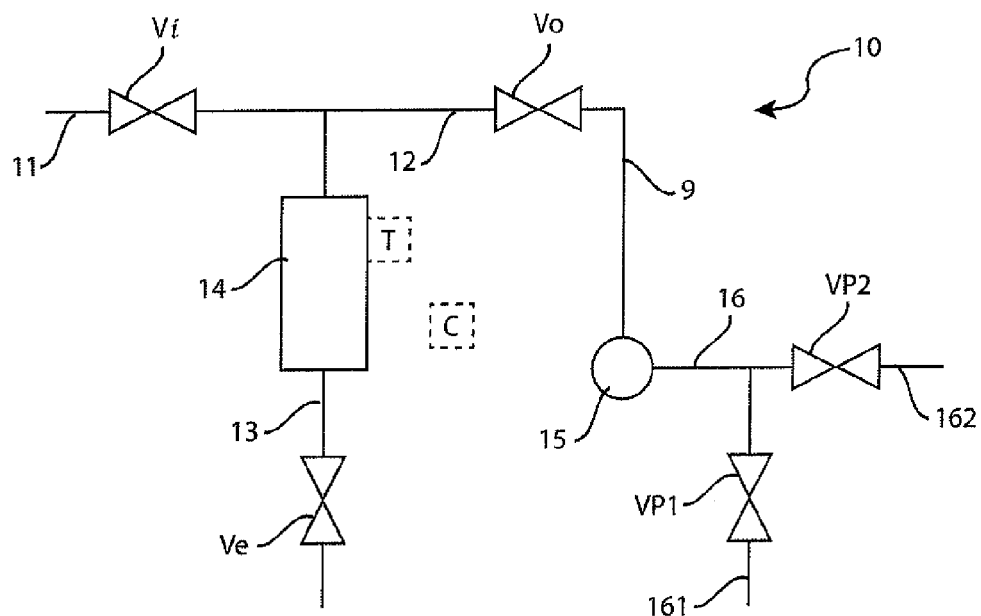
FIG. 2 is a gas circuit schematic of a first example anhydrous ammonia recovery system.

FIG. 1 was described with reference to the prior art. FIG. 2 is a gas circuit schematic of a first example anhydrous ammonia recovery system 10, set forth by way of example and not limitation, including valves Vi, Vo, Ve, VP1 and VP2, a vessel 14, and a vacuum pump 15. Preferably, at least valves Vi, Vo and Ve are capable of automated control. The vessel 14, in this non-limiting example, serves to sorb ammonia ($NH_3$) from gas exhausted from the system 10. Vacuum pump 15 provides the capability of drawing gasses from vessel 14 under a vacuum condition.

In this non-limiting example, an inlet line 11 is coupled to valve Vi, which can serve as a shut-off valve. A line 12 couples the valve Vi to valve Vo and to an inlet port ("vessel inlet") of the vessel 14. Valve Vo is coupled to vacuum pump 15 by a line 9 and a line 16 couples the vacuum pump 15 to lines 161 and 162 via valves VP 1 and VP2, respectively. A line 13 couples a second port of vessel 14 to valve Ve, which provides a vessel outlet.

Vessel 14, in this non-limiting example, contains one or more reversible ammonia sorber materials. In this example, valve VP1 may be actuated in an "unloading phase" such that recovered ammonia flowing through line 16 from pump 15 can be output from line 161 for reuse. Valve VP2 can be actuated, in a venting phase, such that gas flowing through line 16 is preferably directed to a scrubbing system (not shown).

In an embodiment, set forth by way of example and not limitation, an anhydrous ammonia recovery process includes the sequential (and often repeated) phases of loading, venting and unloading the vessel 14, with the switching between venting and unloading phases being time based. As used herein, the "loading phase" describes the period of time when the reversible sorber material is sorbing gas, the "venting phase" describes the period of time when gasses, such as nitrogen, are drawn from the sorber material with a pump ("under vacuum"), and the "unloading phase" is the period of time when ammonia is drawn from the sorber material under vacuum. During loading and venting phases no ammonia is recovered and any gas leaving the gas recovery system is preferably disposed of, for example, by a scrubbing system (not shown). The venting phase for a vessel comes between the loading phase and the unloading phase and, therefore, is sometimes referred to herein as "an intermediate venting phase."

With reference to example system 10, in a loading phase valves Vi and Ve are opened and valve Vo is closed (to isolate the vacuum pump 15 from the main gas circuit) such that gas will flow into line 11, through the vessel 14, and out through line 13. The gases exiting purifier vessel 14 during the loading phase are primarily impure nitrogen (N2) and hydrogen (H2) and may be discarded. Also ammonia, methane, and other gaseous components may be present as a minor constituent of this gas exhaust.

The venting phase may be initiated or "switched" from the loading phase, in a non-limiting examples, based upon a period of time ("time based switch"), and/or based upon gas flow ("gas flow based switch"), and/or based upon temperature ("temperature based switch") with respect to the vessel 14. Time based switching can be used, by way of non-limiting example, when the time duration of the loading phase is constant and predetermined, while flow based switching can be used when the amount of gas flowing through the system during the loading phase is constant or predetermined or by using flow meters in case of variable flows.

By way of non-limiting examples, with a time based switch, the duration of the loading phase can be from about 1 to 40 minutes, inclusive. In certain example embodiments, the time based switch has a factory-set predetermined maximum and/or a field-adjustable predetermined maximum. That is, a maximum operating temperature for the vessel 14 can be set by the manufacturer and/or the maximum operating temperature for the vessel 14 can be set by the customer.

Temperature based switching can be used when the vessel 14 includes an exothermic and reversible sorber material and is provided with a temperature sensor, e.g. one or more thermocouples placed within the vessel. With temperature based switching, a temperature increase can be used to estimate how far the reversible sorption reaction has progressed and therefore can be used as an indicator of the residual capacity of the reversible sorber. In this non-limiting example, a temperature based switch may be advantageous in that it can allow for more efficient ammonia recovery, particularly in the case of input gas flow variations. Furthermore, in this non-limiting example, a temperature based switch can allow for more flexibility and an easy unit set up, potentially eliminating any "fine tuning" in the field to accommodate for different and/or variable gas flows.

In a non-limiting example, a temperature based switch is used to switch from the loading phase to the venting phase when an internal temperature of the vessel 14 is about 25° C. greater than a reference temperature. In other example embodiments, the differential between the internal vessel and a reference temperature ("temperature differential") are within a range of about 1° C. and 75° C., more preferably within 5° C. to 40° C. In still further example embodiments, the temperature differential is about 10 to 30° C. The reference temperature may, in certain non-limiting examples, be an ambient temperature proximate to the vessel 14 or a vessel 14 inlet gas temperature as measured, for example, with one or more thermocouples.

The temperature differential is, to some extent, process dependent. For example, if $NH_3$ concentration is low, temperatures much above the temperature threshold chosen, for example 40° C. may not be achievable. In certain example embodiments, a temperature switching based upon a 10-30° C. temperature differential may be the most efficient in terms of ammonia recovery since it stops the reaction before the sorption capability of the material significant decreases (or stops due to saturation), and therefore tends to ensure that a significant amount of ammonia has been stored in the material. Also in this case a hybrid cycle may be advantageously employed, so that the system switches from loading to venting with the combination of a temperature based switch and a time based switch.

As noted above, various combinations of switching methods can be used. By way of non-limiting example, a system can have a switching process that is a hybrid of temperature and time, e.g. the switching process can be temperature based but with an upper time limit. An advantage of such a hybrid switching process is that it can prevent the system 10 from getting "stuck" in the loading phase for and excessive period of time. This example embodiment has further advantages when applied to two vessels configurations, as described subsequently.

System 10 switches from the loading phase to the venting phase by closing valves Vi and Ve and opening valve Vo. The vacuum pump is activated to pump gasses from the vessel 14 via lines 9 and 12. In the venting phase, VP2 is open and VP1 is closed and the output of pump 15 is discarded via line 162 (e.g. in a scrubber, not shown). This is due to the fact that ammonia is not immediately released in significant amounts by the reversible sorber material of vessel 14, while nitrogen is released. The venting phase is therefore used to remove excess $N_2$ released from the reversible sorber material, such that when the system switches from venting to unloading, the $NH_3$ quality that is output is adequate to permit recovery and reuse.

The termination of the intermediate venting phase can be determined in a number of manners. For example, the duration of the venting phase can be defined by least one of a time threshold, a vapor pressure threshold and an $N_2$ content threshold. For example, the end of the intermediate venting phase can be when less than 1% of the vented gas is $N_2$.

The unloading phase is "switched" from the venting phase by closing valve VP2 and opening valve VP 1. Line 161 provides recovered ammonia ($NH_3$) which can be further purified, stored in pressurized cylinders, and/or fed into gas lines for manufacturing equipment, or otherwise used. In this non-limiting example, system 10 provides ammonia from an output line 161 having acceptable level of impurities such as moisture and nitrogen.

As noted above, the recovered ammonia ($NH_3$) may be stored, by way of non-limiting example, in an $NH_3$ buffer tank (not shown). In addition a compressor (not shown) can be used to pressurize the recovered $NH_3$ to flow through an $NH_3$ purifier (also not shown). An optional $NH_3$ distribution system, such as a clean room or "fab" $NH_3$ line, can provide the recovered $NH_3$ for other manufacturing equipment (not shown) or, optionally, can be recycled directly to the manufacturing equipment from whence it was derived. Alternatively, the $NH_3$ distribution system can comprise storing the recovered $NH_3$ in storage vessels (not shown) to be used for a variety of purposes such as but not limited to fertilizers, cleansers and antiseptics.

As noted above, at least some of the valves are preferably under automatic control. By way of example, these valves can be electrically or pneumatically operated valves controlled, for example, by a controller C. As will be appreciated by those of skill in the art, a controller C can include one or more microprocessors and non-volatile computer memory storing program instructions to implement example processes as set forth herein.

Figure 3:
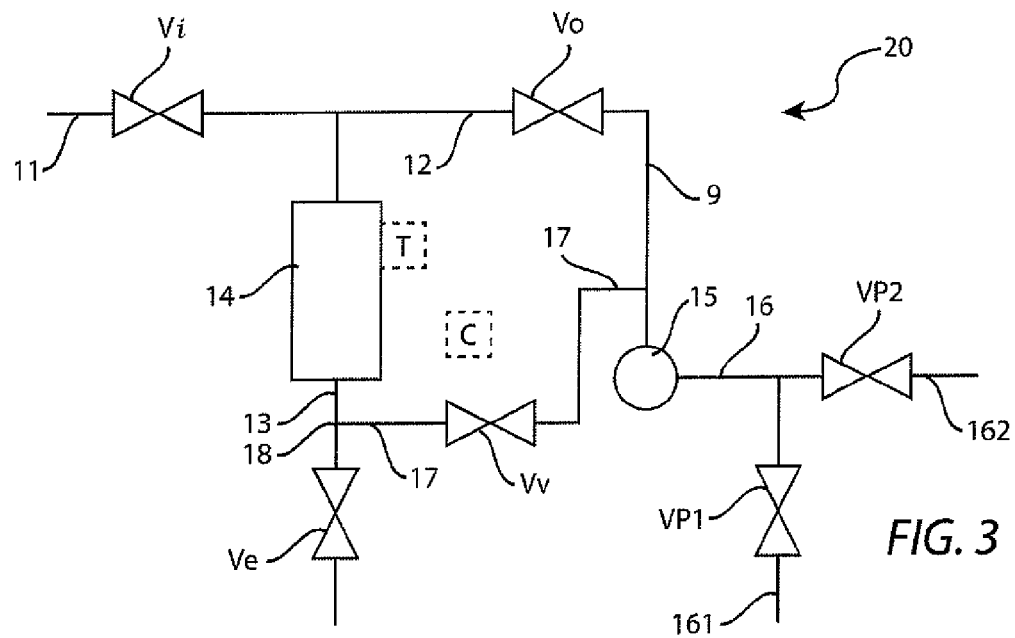
FIG. 3 is a gas circuit schematic of a second example anhydrous ammonia recovery system.

FIG. 3 is a gas circuit schematic of a second example anhydrous ammonia recovery system 20, set forth by way of example and not limitation. The embodiment of FIG. 3 has similarities to the embodiment of FIG. 2, and like elements have been given like reference numbers. In the embodiment of FIG. 3, a line 17, having an intermediate valve Vv (which is preferably electrically or pneumatically actuated and controlled by controller C) is coupled between line 13 and line 9. A connection 18 between line 17 and line 13 is positioned between valve Ve and the purifier vessel 14.

In the non-limiting embodiment of FIG. 3, during a loading phase gas is allowed to flow through vessel 14 by opening valves Vi and Ve, while valves Vo and Vv are closed to isolate vacuum pump 15. In a venting phase, valves Vi, Ve and Vo are closed, valve Vv is open, and vacuum pump 15 is activated.

Valve VP2 is also open, in the venting phase, such that gas can be exhausted via line 162. This example embodiment can be advantageous in that the $N_2$ gas being vented from the vessel 14 is from the lower portion of the vessel, which typically has a lower concentration of ammonia than the upper portion of the vessel. This is particularly the case when the vessel 14 is operated efficiently in the loading phase, e.g. by setting a proper loading time or by using a temperature controlled switch, as described above.

After the venting phase the system switches to an unloading phase. This switch can be accomplished, by way of non-limiting examples, by time and/or pressure based control, as described previously. In this case, valves Vi, Ve, and Vv are closed and valve Vo opened. As in the previous example, pump outlet line 16, i.e. recovered ammonia gas with low levels of nitrogen, can be sent via output line 161 to a storage system, can be immediately re-used, can be further purified, etc.

Figure 3A:
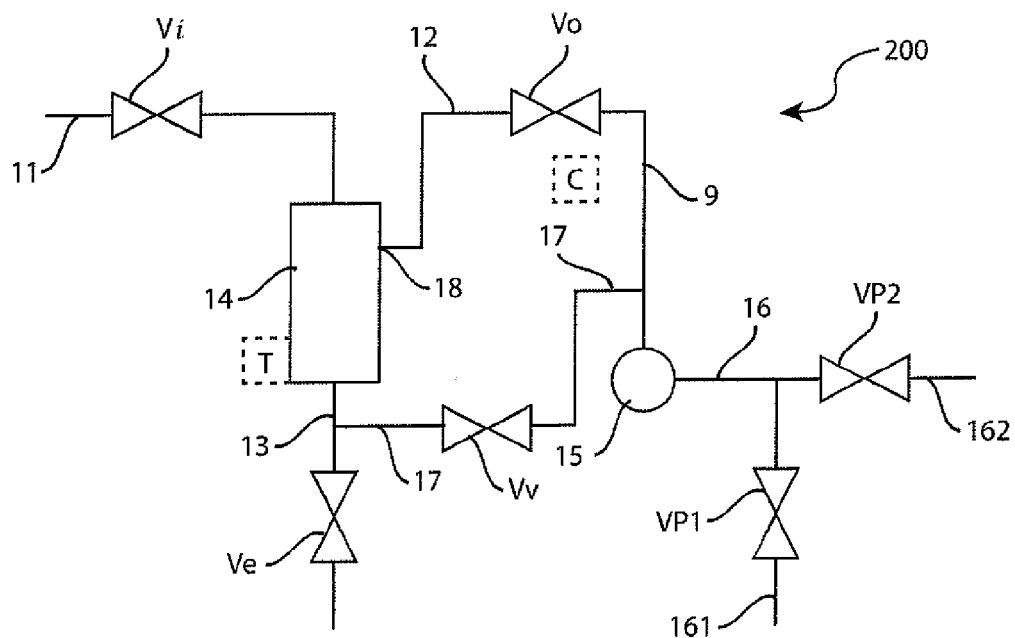
FIG. 3A is a gas circuit schematic of a third example anhydrous ammonia recovery system.

FIG. 3A is a gas circuit schematic of a third example anhydrous ammonia recovery system 200. The embodiment of FIG. 3A has similarities to the embodiments of FIGS. 2 and 3, and like elements are again given like reference numbers. In the example embodiment of FIG. 3A, line 12 is connected directly to the vessel 14 instead of to inlet line 12. The connection point 18, under certain conditions, aids in the unloading process by drawing $NH_3$ directly from an upper portion of vessel 14 where the $NH_3$ concentration is the highest.

Figure 4:
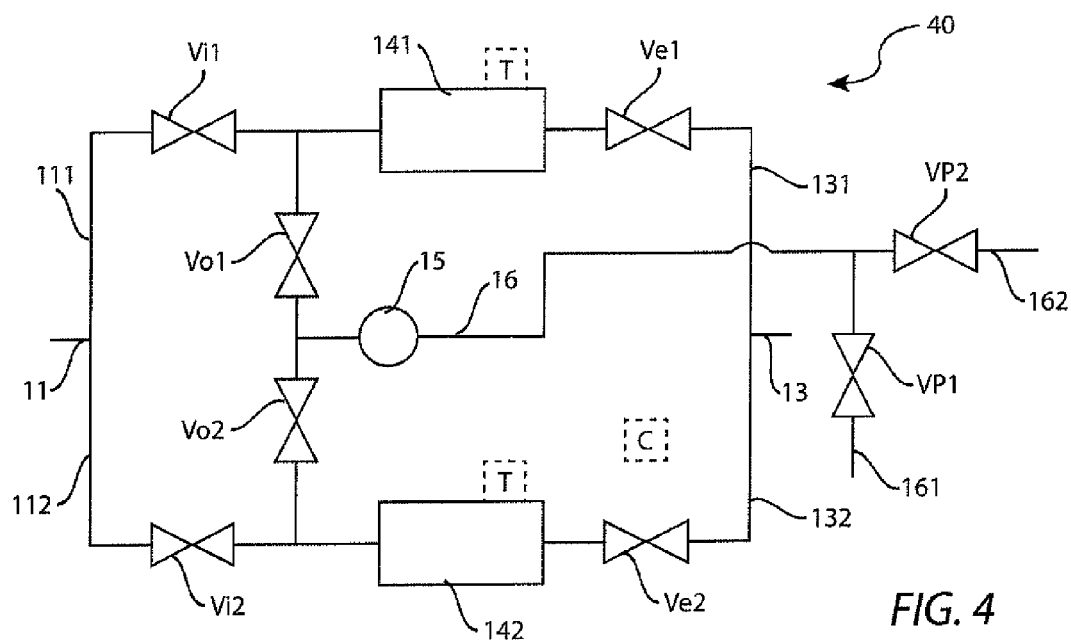
FIG. 4 is a gas circuit schematic of a fourth example anhydrous ammonia recovery system.
Figure 5:
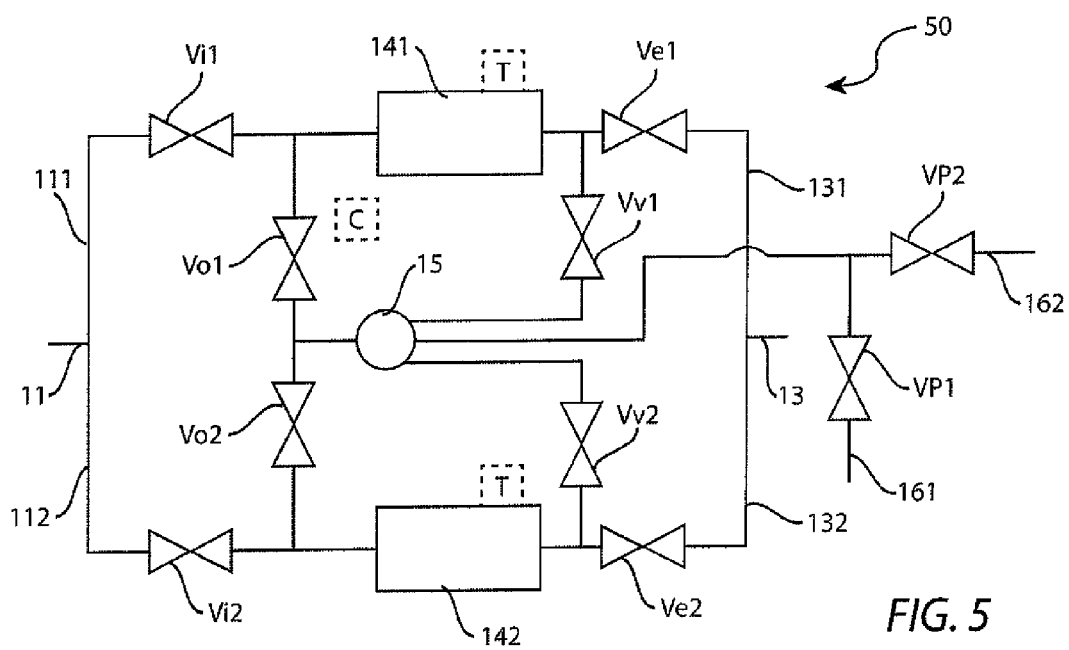
FIG. 5 is a gas circuit schematic of a fifth example anhydrous ammonia recovery system.

FIG. 4 and FIG. 5 illustrate, by way of non-limiting examples, anhydrous ammonia recovery systems using more than one vessel. This can be advantageous in that, with such systems, continuous operation can be achieved, e.g. while one vessel is in venting and unloading ($NH_3$ release) phase, the other vessel is in a loading phase.

FIG. 4 is a gas circuit schematic of a fourth non-limiting example anhydrous ammonia recovery system 40 of the type represented in FIG. 2, but in this case using two vessels 141 and 142. Again, like references will refer to like elements. Inlet line 11 divides into lines 111 and 112, which are preferably provided with electronically or pneumatically activated valves Vi1 and Vi2, in this non-limiting example. A vacuum pump 15 is coupled to the inlet lines of vessels 141 and 142 by valves Vo1 and Vo2. Line 16 is coupled to lines 161 and 162 by valves VP1 and VP2, respectively. Downstream of the vessel purifiers, on lines 131 and 132, are placed valves Ve1 and Ve2, having line 13 as their common outputs.

The basic ammonia recycling method, valve configurations, and phase switching criteria, have already been described above with reference, for example, to FIG. 2. However, in this example embodiment, valves Vi1 and Vi2 alternatively select which vessel 141/142 is in a loading phase (e.g. whether inlet valve Vi1 or Vi2 is open) and which one undergoes venting and unloading (e.g. whether inlet valve Vi1 or Vi2 is closed).

FIG. 5 is a gas circuit schematic of a fifth example anhydrous ammonia recovery system 50 of the type illustrated in FIG. 3, using two purifier vessels 141/142 as illustrated in FIG. 4. Also in this case, valves Vi1 and Vi2 select the vessel that is in the loading phase and the one that is in the venting and unloading phase. As before, like reference numerals refer to like elements of previous example embodiments.

As used herein, "lines", "tubes" and the like shall refer to the connecting tubing that carry gas within the system. The valves, by way of non-limiting example, can be made from electropolished stainless steel. Also while in all of the non-limiting examples set forth herein, 2-way valves are illustrated, other type of valves may be used. For example, in FIG. 5 a single 3-way valve may be used in place of valves Vv1 and Ve1 and/or valves Vv2 and Ve2. Such design variations are well within the capabilities of a person of ordinary skill in the art. Also, in certain example embodiments, a pre-column may be provided to remove trace contamination, typically, but not limited to, unreacted organometallic compounds, organic adducts and particles, to protect the sorption media contained in the first vessel 141 and second vessel 142.

In the example embodiments of FIGS. 4 and 5, vessels 141 and 142 can be heated and/or cooled by thermal devices T to enhance the $NH_3$ sorption/desorption process. This also applies the previously described single vessel 14 embodiments of FIGS. 2, 3 and 3A, which can also be provided with thermal devices T. As one example, the vessels 141 and 142 can be heated and/or cooled within the range of 5-90° C. However, for fast bed switching, the temperature during the sorption/desorption cycle is not based upon temperatures cycles in certain non-limiting example. Furthermore, to help maintain stable vessel temperatures, the sorbing media can be optionally mixed with a ballast (e.g. stainless steel and/or aluminum beads). Apparatus for heating and cooling vessels are well known to those of skill in the art. For example, water jackets can be used to both heat and cool vessels, electric blankets can be used to heat vessels, and fans can be used to cool vessels.

Figure 6:
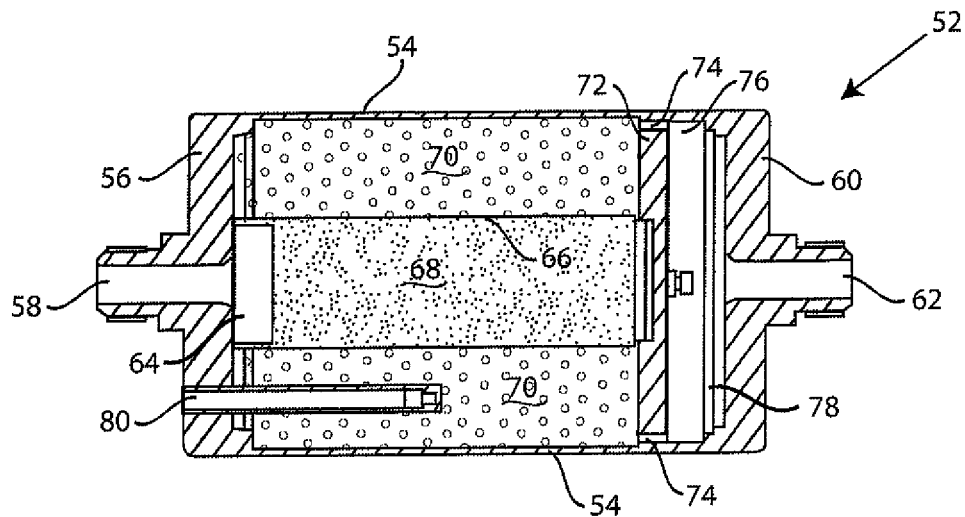
FIG. 6 is a cross-sectional view of a vessel, set forth by way of example and not limitation, which can be used in an anhydrous ammonia recovery system.

In FIG. 6, a purifier vessel ("vessel") 52, set forth by way of example and not limitation, includes a cylindrical shell 54, a first cylindrical end cap 56 having a first port 58, a second cylindrical end cap 60 having a second port 62, a first port filter 64, a hollow, porous insert 66 defining a chamber 68, sorbing media 70, an endplate 72 configured to provide an annular passage 74 proximate to an inner surface of the cylindrical shell 54, a plenum 76, a second port filter 78 and a thermocouple 80 inserted into the $NH_3$ sorber material 70. Two vessels 52 can be used as the vessels 141 and 142 of the example systems of FIGS. 4 and 5, and the vessel 52 can be used as the vessel 14 of the example systems of FIGS. 2, 3, and 3A.

In an example embodiment, more than one thermocouple, e.g. two thermocouples, may be provided, where one is placed close to the first port 58 and one is placed close to the second port 62. In this non-limiting example, the differential reading of the thermocouples provides additional information on the ammonia penetration from in the purifier as well as information on the undergoing reaction. In another example embodiment, a single thermocouple is placed in a lower portion of the vessel (e.g. closer to the second port 62) "below" a vessel midpoint. For example, a thermocouple sensing head can be placed in the last 40% of an active part of the vessel (where the "active part" of a vessel can be defined as the portion containing the "active media" or "reversible sorber"). In this non-limiting embodiment, the "first" or "upper" portion of vessel 52 is the half of the vessel proximate the first port 58 and the "second" or "lower" portion of vessel 52 is the half of the vessel proximate to second port 62, where a "midpoint" of the vessel 52 is an imaginary boundary between the two portions of the vessel.

As will be appreciated by those of skill in the art, the vessels 14, 141, and/or 142, may take other configurations typical of purifiers in terms of vessel shape and gas flow path such as, by way of non-limiting example, the ones described in U.S. Pat. No. 5,151,251, the disclosure of which is incorporated herein by reference. Moreover, the external shape of the vessel is not limited to a specific geometry or shape such that, by way of non-limiting examples, simple cylinder configurations, elliptical configurations, etc. can be advantageously employed.

With reference to FIG. 6, when vessel 52 is in a loading phase, exhaust gas from, for example, an MOCVD chamber can enter the vessel through first port 58, flow through first port filter 64 into chamber 68, though the porous insert 66 and into the ammonia ($NH_3$) sorber material 70. Other gasses, such as $H_2$ and $N_2$, flow through the $NH_3$ sorber material 70 and out the annular passage 74 into the plenum 76 and, from there, through second port filter 78 and out of second port 62.

Also in this non-limiting example, when in a releasing phase, a vacuum is applied to first port 58 such as by a high-vacuum pump, and $NH_3$ is released from the $NH_3$ sorber material 70. The $NH_3$ flows into the chamber 68 through the porous insert 66 and, from there, through first port filter 64 and out the first port 58.

It should be noted that $NH_3$ is generally adsorbed by the sorber material 70 as an exothermic reaction and is generally released by the sorber material as an endothermic reaction. Thermocouple 80 can be used to monitor the temperature of the sorber material. If, for example, a vessel 14/141/142 begin(s) to overheat during the loading phase or chill in the releasing phase, the process can be reversed bring the temperature back towards the desired temperature range.

The sorber material 70 should be selective for the target gas $NH_3$, is preferably of high storage capacity, and preferably releases $NH_3$ easily when under vacuum. Suitable sorber materials include high-surface area materials such as, by way of non-limiting examples, FeMn catalyst, Ni based catalyst, zeolites, alumina, silicon oxides and molecular sieves. More than one of these materials may be employed in certain non-limiting examples, e.g. when more active materials (reversible ammonia sorbers) are desired, which can be mixed together and/or placed sequentially within the vessel. In other non-limiting examples, only a single material is used as the reversible ammonia sorber of the vessel.

For example, the Grace Davidson subsidiary of W.R. Grace & Co. manufactures zeolite molecular sieves made from a crystalline alumino silicate that is characterized by a three-dimensional pore system of a precisely defined diameter. By selecting a zeolite capable to physisorb $NH_3$ due to its electrical dipole while letting $H_2$ and $N_2$ pass through, ammonia will be selectively sorbed by the zeolite. For example, Grace Davison Molecular Sieve Type X, which is a sodium form of zeolite X (13X) having pores of approximately 8 Ångstrom, has been found suitable for use as sorber material 70.

In an example embodiment, the reversible ammonia sorber material includes 13X molecular sieves. In a further example embodiment, the 13X molecular sieves are at least about 50% by weight ("50 wt. %") of the reversible ammonia sorber material. In a still further example embodiment, the 13X molecular sieves are at least about 90% by weight ("90 wt. %") of the reversible ammonia sorber material.

Figure 7:
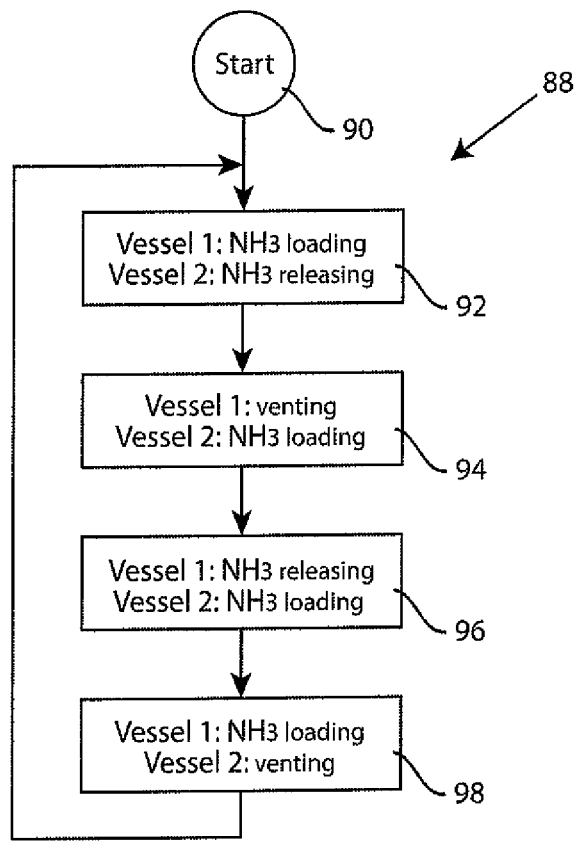
FIG. 7 is a flow diagram of a process, set forth by way of example and not limitation, for separating ammonia ($NH_3$) from other gasses.

FIG. 7 illustrates a process 88, set forth by way of example and not limitation, for operating example anhydrous ammonia recovery system 40 of FIG. 4. In an operation 92 vessel 141 ("Vessel 1") is loaded with $NH_3$ while vessel 142 ("Vessel 2") releases $NH_3$. This can be accomplished by opening valves Vi1, Ve1, Vo2 and VP1, closing valves Vo1, Vi2, Ve2 and VP2, and activating vacuum pump 15. Next, in an operation 94, vessel 141 is vented to remove residual gasses such as $H_2$ and $N_2$ through valve VP2. Then, in an operation 96, vessel 142 is loaded with $NH_3$ while first vessel 141 releases $NH_3$. This can be accomplished by opening valves Vo1, Vi2, Ve2 and VP2, closing valves Vi1, Ve1, Vo2 and VP1, and operating vacuum pump 15. Finally, in an operation 98, first vessel 141 starts a loading phase and second vessel 142 starts a venting phase by, for example, opening valves Vi1, Ve1, Vo2 and closing valves Vi2, Vo1, Ve2 and VP2 (for the discharge of the pump outlet gas via line 16). Process 88, in this non-limiting example, then repeats the cycle beginning with operation 92. The valves and/or vacuum pump can be controlled manually or by, for example, using controller C as described previously.

In an example embodiment, the two vessels can be sized for relatively fast "bed switching", e.g. exchanging the functionality of one vessel for the other. For example, the functions of the vessels can be reversed every 20 minutes or so to keep the system relatively compact and cost effective. Also more complex system may be employed using more than two vessels operating alternatively.

Examples Demonstrating Effectiveness of Intermediate Venting Phase

A $NH_3$ recovery process with process identification ("Process ID") P0 that does not include an intermediate venting phase is used as a control process. $NH_3$ recovery processes with Process IDs P1 and P2 include an intermediate venting phase. Process P1 implements both an intermediate venting phase and an unloading phase from an inlet port of the vessel, while process P2 implements an intermediate venting phase from an outlet port of the vessel and an unloading phase from an inlet of the vessel. The $N_2$ concentration in the recovered ammonia gas for each of processes P0, P1 and P2 can be compared in Table 1.

TABLE 1

| Process ID | Process Description | N2 conc. (%) |
|---|---|---|
| P0 | No intermediate venting | 3-4 |
| P1 | 20 sec vent from inlet | 0.5-0.7 |
| P2 | 20 sec vent from outlet | 0.5-0.7 |

In the example illustrated by Table 1, it can be seen that processes P1 and P2, which include an intermediate venting phase, exhibit much lower $N_2$ concentrations ("contamination") in the recovered ammonia ($NH_3$) than process P0, which did not include an intermediate venting phase.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for recovering ammonia from exhaust gas comprising:
   loading a vessel, during a loading phase of not less than 1 minute and not more than forty minutes, with an input gas containing ammonia via a vessel inlet proximate to a first portion of the vessel, wherein the vessel contains a reversible ammonia adsorber material;
   venting the vessel via a venting outlet, under a vacuum condition, during an intermediate venting phase after the loading phase, wherein the intermediate venting phase has a duration defined by at least one of a time threshold, a vapor pressure threshold and an $N_2$ content threshold; and
   unloading the vessel via an unloading outlet, under a vacuum condition, during an unloading phase after the intermediate venting phase, whereby ammonia is recovered from exhaust gas.

2. The method as recited in claim 1 wherein the venting outlet and the unloading outlet are the same.

3. The method as recited in claim 1 wherein the vessel inlet and the unloading outlet are the same.

4. The method as recited in claim 1 wherein the unloading outlet is different from the vessel inlet and is positioned in the first portion of the vessel.

5. The method as recited in claim 1 wherein, at the end of the intermediate venting phase, less than 1% of the vented gas is $N_2$.

6. The method as recited in claim 1 wherein the vessel is provided with at least one temperature sensor.

7. The method as recited in claim 6 wherein the at least one temperature sensor includes a thermocouple positioned within a second portion of the vessel.

8. The method as recited in claim 6 wherein the initiation of the venting phase is based upon at least one of sensing of a threshold temperature within the vessel and of a timed duration limit of the loading operation.

9. The method as recited in claim 8 wherein the threshold temperature is in the range of about 1 to 75° C. above a reference temperature.

10. The method as recited in claim 9 wherein the threshold temperature is in the range of about 5 to 40° C. above the reference temperature.

11. The method as recited in claim 10 wherein the threshold temperature is in the range of about 10 to 30° C. above the reference temperature.

12. The method as recited in claim 8 wherein the timed duration limit of the loading operation has a factory-set predetermined maximum.

13. The method as recited in claim 8 where the timed duration limit of the loading operation has a field-adjustable predetermined maximum.

\* \* \* \* \*